US012134123B2

(12) United States Patent
Hennig et al.

(10) Patent No.: US 12,134,123 B2
(45) Date of Patent: Nov. 5, 2024

(54) USE OF A COATING COMPOSITION AND CORRESPONDING METHOD FOR PRODUCING A CENTRIFUGAL CASTING MOULD WITH A COATING

(71) Applicant: HÜTTENES-ALBERTUS Chemische Werke Gesellschaft mit beschränkter Haftung, Düsseldorf (DE)

(72) Inventors: Sven Hennig, Barsinghausen (DE); Andreas Jattke, Hannover (DE); Klaus Seeger, Hannover (DE)

(73) Assignee: HÜTTENES-ALBERTUS Chemische Werke Gesellschaft mit beschränkter Haftung, Düsseldorf (DE)

( * ) Notice: Subject to any disclaimer, the term of this patent is extended or adjusted under 35 U.S.C. 154(b) by 906 days.

(21) Appl. No.: 17/268,015

(22) PCT Filed: Aug. 13, 2019

(86) PCT No.: PCT/EP2019/071659
§ 371 (c)(1),
(2) Date: Feb. 11, 2021

(87) PCT Pub. No.: WO2020/035474
PCT Pub. Date: Feb. 20, 2020

(65) Prior Publication Data
US 2021/0178459 A1 Jun. 17, 2021

(30) Foreign Application Priority Data
Aug. 13, 2018 (DE) .......................... 102018119635.0
Dec. 11, 2018 (DE) .......................... 102018131811.1

(51) Int. Cl.
B22C 3/00 (2006.01)
B05D 1/02 (2006.01)
B22C 9/06 (2006.01)
B22D 13/10 (2006.01)
C04B 35/48 (2006.01)
C04B 35/482 (2006.01)
C04B 35/622 (2006.01)

(52) U.S. Cl.
CPC ................. *B22C 3/00* (2013.01); *B05D 1/02* (2013.01); *B22C 9/06* (2013.01); *B22D 13/102* (2013.01); *C04B 35/481* (2013.01); *C04B 35/482* (2013.01); *C04B 35/62222* (2013.01); C04B 2235/3248 (2013.01); C04B 2235/3418 (2013.01); C04B 2235/422 (2013.01); C04B 2235/528 (2013.01); C04B 2235/5436 (2013.01)

(58) Field of Classification Search
CPC ................. C04B 35/481; C04B 35/482; C04B 35/62222
See application file for complete search history.

(56) References Cited

U.S. PATENT DOCUMENTS

| 2,623,809 | A | 12/1952 | Myers |
|---|---|---|---|
| 3,357,481 | A | 12/1967 | Snyder |
| 3,707,386 | A | 12/1972 | Kurz |
| 4,297,309 | A | 10/1981 | North |
| 6,540,013 | B1 | 4/2003 | Doles |
| 10,232,430 | B2 | 3/2019 | Müller et al. |
| 2001/0004498 | A1 | 6/2001 | Saito |
| 2002/0157571 | A1 | 10/2002 | Takeo |
| 2005/0161187 | A1 | 7/2005 | Kodama |
| 2007/0012178 | A1 | 1/2007 | Takami |
| 2007/0240652 | A1 | 10/2007 | Michioka |
| 2008/0115691 | A1 | 5/2008 | Margaria |
| 2009/0218066 | A1 | 9/2009 | Stoetzel |
| 2009/0266110 | A1 | 10/2009 | Werdecker |
| 2010/0133415 | A1 | 6/2010 | Tronstad |
| 2010/0330282 | A1 | 12/2010 | Nienburg |
| 2011/0220387 | A1 | 9/2011 | Szylakowski |
| 2012/0048106 | A1 | 3/2012 | Horigome |
| 2014/0196863 | A1 | 7/2014 | Bates |
| 2015/0122118 | A1 | 5/2015 | He |

(Continued)

FOREIGN PATENT DOCUMENTS

| CN | 1775414 | 5/2006 |
|---|---|---|
| CN | 101554643 | 10/2009 |

(Continued)

OTHER PUBLICATIONS

KR20130092822A, Machine Translation. (Year: 2013).*
Friede, B., et al., "Mikrosilica—ein Staub macht Karriere (Microsilica—Dust carves out a career for itself)," Nachrichten aus der Chemie, Oct. 2011, 59(10): 956-958.
EN 12879:2000, "Characterization of sludges—Determination of the loss on ignition of dry mass," European Committee for Standardization, Aug. 2000.
Din En Iso 3251:2008-06, "Paints, varnishes and plastics—Determination of non-volatile-matter content," European Committee for Standardization, Feb. 2008.

(Continued)

*Primary Examiner* — Robert A Vetere
(74) *Attorney, Agent, or Firm* — DUANE MORRIS LLP; Gregory M. Lefkowitz; Brandon A. Chan

(57) ABSTRACT

A description is given of the use of a refractory coating composition having a solids fraction of more than 69 wt %, based on the total mass of the coating composition, and also having a loss on ignition of less than 0.6 wt %, based on the total mass of the solids fraction of the coating composition, for producing a refractory coating on the inner walls of a centrifugal casting mold by means of a spray application. Further described is a method for producing a centrifugal casting mold provided on its inner walls with a refractory coating, for use in the centrifugal casting process, and also a method for producing a casting in the centrifugal casting process, preferably having a structured surface. Also described is a centrifugal casting mold for use in the centrifugal casting process, having a refractory coating on the inner walls of the centrifugal casting mold.

22 Claims, No Drawings

(56) References Cited

U.S. PATENT DOCUMENTS

| | | | |
|---|---|---|---|
| 2015/0221465 A1 | 8/2015 | Gentsch | |
| 2017/0304890 A1 | 10/2017 | Cieplewski | |
| 2017/0320128 A1 | 11/2017 | Deters | |
| 2018/0193902 A1 | 7/2018 | Krumrei | |
| 2018/0362406 A1* | 12/2018 | Meunier | C04B 35/047 |
| 2020/0001354 A1* | 1/2020 | Jattke | C08K 3/36 |

FOREIGN PATENT DOCUMENTS

| | | | |
|---|---|---|---|
| CN | 103817285 | | 5/2014 |
| CN | 107619990 | | 1/2018 |
| DE | 10339676 | | 3/2005 |
| DE | 102013113439 | | 6/2014 |
| DE | 102017106458 | | 11/2017 |
| DE | 102017107655 | | 7/2018 |
| DE | 102017107657 | | 7/2018 |
| DE | 102017107658 | | 7/2018 |
| EP | 0246181 | | 11/1987 |
| EP | 2159208 | | 3/2010 |
| GB | 722459 | | 1/1955 |
| GB | 865301 | | 4/1961 |
| JP | H03207777 | | 9/1991 |
| KR | 101011331 | | 1/2011 |
| KR | 20130092822 | * | 8/2013 |

OTHER PUBLICATIONS

Heiri, O., et al., "Loss on ignition as a method for estimating organic and carbonate content in sediments: reproducibility and comparability of results"; Journal of Paleolimnology, 2001, vol. 25, pp. 101-110.

Bergna, H.E., et al., "Colloid Chemistry of Silica," Adv. Chem. Ser. 234, American Chemical Society, Washington D. C., 1994, pp. 1-47.

Mercury porosimetry—3P Instruments, printout of the website: https://www.3pinstruments.com/de/measurement-methods/mercury-porosimetry/.

European Pharmacopoeia 6.2, Council of Europe, Council of Europe, 2007, Seiten 3643-3645, Kapitel 2.9.32 "Porosity and Pore-Size Distribution of Solids by Mercury Porosimetry".

Iler, R.K., et al., "The Chemistry of Silica, Solubility, Polymerization, Colloid and Surface Proper-ties and Biochemistry of Silica", 1979, Wiley & Sons Ltd, Chapter 4, pp. 313-363, and Chapter 5, pp. 462-513.

"Product Specification" Elkem Microsilica 971, Rev.3, Jan. 18, 2011.

Screen shot of https://polymers.sibelcotools.com/mineral/fused-silica/.

Table "How to Compare Various Viscosity Measuring Cups in Seconds to Centipoise—Viscosity Conversion Chart," https://cattieadhesives.com/wp-content/uploads/2019/01/How-to-comparevarious-viscosity-measuring-cups-in-seconds-tocentipose.pdf.

Table "Vicsosity Cup Conversion Chart", www.elcometer.com.

Flowcups Models 243, Product information https://www.erichsen.de/en-qb/products/surface-testina/viscositv-density-andconsistency/ flow-cup/flow-cup-1/model-243-ii-2.

Janco, N., et al., "Centrifugal Casting," American Foundrymens Society (Jun. 1, 1988), Title, synopsis and Chapter 1 (S. 1-6), Chapter 6 (S. 33-38) und Chapter 13 (S. 65 ff.).

* cited by examiner

USE OF A COATING COMPOSITION AND CORRESPONDING METHOD FOR PRODUCING A CENTRIFUGAL CASTING MOULD WITH A COATING

CROSS-REFERENCE TO RELATED APPLICATIONS

This application is a § 371 national stage entry of International Application No. PCT/EP2019/071659, filed on Aug. 13, 2019, which claims priority to German Patent Application No. 10 2018 119635.0, filed on Aug. 13, 2018, and German Patent Application No. 10 2018 131811.1, filed on Dec. 11, 2018, the entire contents of which are incorporated herein by reference.

The present invention relates to the use of a refractory coating composition having a solids fraction of more than 69 wt % (based on the total mass of the coating composition) and having a loss on ignition of less than 0.6 wt % (based on the total mass of the solids fraction of the coating composition). The present invention further relates to a method for producing a centrifugal casting mold provided on its inner walls with a refractory coating, for use in the centrifugal casting process, and also a method for producing a casting in the centrifugal casting process, preferably having a structured surface. The present invention likewise relates to a centrifugal casting mold for use in the centrifugal casting process, having a refractory coating on the inner walls of the centrifugal casting mold.

The present invention is defined in the appended claims.

In contrast to sand casting processes, in which the casting molds are destroyed after casting in order to remove the cast parts, permanent metallic molds, manufactured for example in cast iron or steel, can be used again after the cast part has been removed, for the next casting. Even fairly large runs can be manufactured economically in this way. As well as simple geometries, such as blocks or sleeves, for example, complex geometries can also be produced by permanent mold casting, through the use of mold sliders, inserts, and sand cores.

In permanent mold casting, there are various casting processes that are differentiated. The most simple and at the same time most common permanent mold casting process is that of gravity casting, in which gravity is used to fill the metal melt into the corresponding mold, and the completed molding is removed from the usually two-part or multi-part mold after solidification and cooling have taken place. With this kind of permanent mold casting process, it is necessary, particularly during the construction of the mold that is to be used, to ensure that the liquid metal fills all sectors of the mold, before solidification begins in the portions remote from the sprue and thin-wall portions, since otherwise there is a risk of the development of casting defects in the form of cavities which develop during solidification (known as shrink holes).

One particular process in the field of permanent mold casting is that of centrifugal casting. In the centrifugal casting process, the metal melt is filled, typically via a runner, into a metal mold which rotates about its central axis, and is pressed uniformly by the centrifugal force (gas-free, without shrink holes and slag inclusions) against the mold wall. Under the action of the centrifugal forces, the liquid metal solidifies and develops a very pure and highly compacted microstructure. With centrifugal casting, there is no need for cores to produce the cavity. Under exposure to the centrifugal force, a hollow cylindrical body is formed (e.g., a pipe, ring or the like) with a wall thickness which is determined by the amount of metal supplied. The resulting blank (hollow body) is pulled from the mold (also referred to as centrifugal casting mold) after solidifying, and is passed on for further machining.

Typically, especially in the case of steel and iron casting, the surfaces of foundry moldings are given a coating (also called a refractory coating), particularly those surfaces which come into contact with cast metal. Refractory coatings here form a boundary layer or barrier layer between mold and metal, for purposes which include the targeted suppression of defect mechanisms at these locations, or the utilization of metallurgical effects. Generally speaking, refractory coatings in foundry technology are intended in particular to fulfil the following functions known to the skilled person:
- maximum separation between liquid metal and mold;
- avoidance of chemical reactions between constituents of mold and melt, thereby facilitating the separation between mold and casting; and/or
- prevention of surface defects on the casting.

Refractory coatings which are employed in the centrifugal casting process are, moreover, generally expected, in the context of the present invention, to meet the following specific requirements:
- high insulating effect;
- rapid drying rate;
- low level of gas evolution during the casting operation;
- high gas absorbency (when using unvented centrifugal casting molds);
- realization of simple separation between casting and centrifugal casting mold when casting operation is complete (good pulling characteristics); and/or
- influencing or dictating the surface structure of the casting.

An important factor for the development of microstructure and for the hardness profile of castings, especially those produced in the centrifugal casting process, is the insulating effect of the refractory coating. A high insulating effect results in a retarded transfer of heat from the liquid metal to the centrifugal casting mold, and hence contributes to the control of solidification and cooling. Factors influencing the desired insulating effect include the coat thickness of the refractory coating and its composition.

To prepare for a centrifugal casting process, the refractory coating composition is applied typically in a spraying process, using a spraying lance, to the inner walls of the centrifugal casting mold. In order to realize low cycle times in production—and hence a high productivity—the resultant refractory coating ought to dry quickly in the context of the present invention.

Unvented centrifugal casting molds are used predominantly in the centrifugal casting process. In contrast to vented centrifugal casting molds, the mold faces of unvented centrifugal casting molds do not possess any holes through which the gases formed during the casting operation can escape. Since unvented centrifugal casting molds are therefore impermeable to gas, the refractory coating in the centrifugal casting process often has an important function in terms of gas regulation during the casting operation. In order to avoid gas defects, in the context of the present invention, the refractory coating is to have a certain porosity and is to be capable of absorbing decomposition gases that are produced. At the same time, the evolution of gas by the refractory coating itself ought to be extremely low, advantageously suggesting a low organic fraction and also a low level of gasifiable constituents of other kinds, measurable as loss on ignition.

Via the composition of the refractory coating it is also possible, in the context of the present invention, to exert positive influence over the pulling characteristics of the casting. When the casting is pulled from the centrifugal casting mold after solidification, the refractory coating is to adhere to it and to be removed, ideally completely, from the centrifugal casting mold along with the casting. For workplace cleanliness it is desirable, in the context of the present invention, to have, on the casting, a refractory coating in the form of a coherent coat which exhibits only very slight dusting or none. Conversely, after the extraction of the casting from the centrifugal casting mold, the refractory coating ought preferably to be able to be removed from the casting again easily, by being blasted off, for example.

The respective refractory coating likewise influences the structure of the outer surface of the eventual casting. In this context, both smooth and structured surfaces can be produced, depending on the composition of the refractory coating. The production of structured surfaces is particularly relevant to the manufacture of structured cast sleeves, preferably of cylinder sleeves, in the context of the present invention as well. The outer wall of a structured cast sleeve has a rough surface structure which is formed during the casting procedure and which ideally requires no further machining. The surface structure in this case typically has depths of between 0.3 and 1.1 mm, optionally with undercuts or other structures (see, for example, FIG. 2 of US 2015/0122118 A1). In the case of the production, for example, of aluminum engine blocks, the structured sleeves are cast directly, in a pressure casting process, into the engine block. The liquid metal flows around the structured surface and fills in indentations and also any undercuts present, so that the materials of both components—engine block and sleeve—enter into an extremely strong and robust bond. The increased surface area of the structured sleeve, as compared with a sleeve without structuring, additionally has the effect in the engine of improved conduction of heat away from the combustion chamber into the water chamber.

The functions and requirements identified above, and possibly further functions and requirements, are adjusted and optimized, and/or adapted to the particular intended purpose, in the context of the present invention through the precise composition of the refractory coating or of the coating composition to be applied to the mold.

Refractory coating compositions for foundry use include usually the following components, or are composed thereof: (i) one or more fine-grained refractories, i.e., fine-grained, refractory to highly refractory inorganic materials, (ii) a carrier liquid comprising one or more compounds (water, alcohols, etc.) and also (iii), as further constituents, e.g., one or more refractory binders (also referred to for short below as "binders") and/or biocides and/or wetting agents (also referred to below as surface-active substances) and/or rheological additives (e.g., thickeners). This is the case correspondingly in the context of the present invention. Refractory coating compositions for the coating of molds, accordingly, are usually dispersions of fine-grained, refractory to highly refractory inorganic materials (refractories) in a carrier liquid, e.g., an aqueous (i.e., water-containing) carrier liquid or a nonaqueous (i.e., non-water-containing) carrier liquid; for details regarding the carrier liquid, see later on below.

A refractory coating composition may further comprise foam regulators, pigments and/or dyes; this is also the case in the context of the present invention. Examples of pigments are red and yellow iron oxides and also graphite. Examples of dyes are commercial dyes known to the skilled person.

The refractory coating composition is applied to the inside of the casting mold by a suitable application method, such as spraying or brushing, for example, and is dried there to form a refractory coating. The application of the coating composition by brushing is an application method which is multiple times slower by comparison with spraying. If the coating composition to be applied to the inside of the casting mold is in powder form, the corresponding coating composition is customarily applied by tipping the powder onto the inside of the casting mold while rotating said mold. In this case, however, uniform distribution of the coating composition is difficult to realize. Moreover, when using coating compositions in powder form, it is generally not possible to produce refractory coatings with a structured surface and, consequently, castings with a structured surface. In the case of centrifugal casting, the coating composition therefore (as already mentioned above) is applied customarily as a dispersion, by means of spray application, to the inner walls of a centrifugal casting mold; this corresponds to the procedure in the context of the present invention.

In the context of the present invention, the refractory coating is customarily dried by supply of heat from the centrifugal casting mold. This centrifugal casting mold is either still warm, owing to a preceding casting operation, or is preheated, in an oven, for example, before the coating composition is applied. The temperature of the centrifugal casting mold at the start of application of the coating composition is preferably between 150 and 450° C. A temperature of this kind for the centrifugal casting mold ensures rapid drying of the coating composition, and, ideally, complete removal of the liquid—e.g., aqueous—phase present in the coating composition.

The term "refractory" is used in the present text, in agreement with the customary understanding of those skilled in the art, to refer to compositions, materials and minerals which are able at least for a short time to withstand the temperature exposure associated with the casting and/or the solidification of an iron melt, usually cast iron. Compositions, materials and minerals referred to as "highly refractory" are those which are able over the short term to withstand the casting heat of a steel melt. The temperatures which may occur during the casting of steel melts are usually higher than the temperatures which may occur during the casting of iron or cast-iron melts. Refractory compositions, materials and minerals (refractories) and highly refractory compositions, materials and minerals are known to the skilled person, from DIN 51060:2000-06, for example.

Refractories used in refractory coating compositions are customarily mineral oxides, silicates or clay minerals. Examples of refractories which are also suitable in the context of the present invention are aluminum silicates, phyllosilicates, olivine, talc, mica, graphite, coke, feldspar, kaolins, calcined kaolins, metakaolinite, iron oxide and chromite, which can each be used individually or in any desired combinations with one another. In refractory coating compositions for use in the invention, the total amount of crystalline silicon dioxide and also crystalline aluminum oxide, crystalline zirconium oxide and crystalline zirconium silicate used is preferably less than 10 wt %, based on the total amount of particulate amorphous oxide used. The effects achieved by means of the refractory include thermal insulation between casting mold and liquid metal. The refractory is usually provided in powder form. The particle size (preferably measured by light scattering according to ISO 13320:2009) of preferred refractories is situated—in the context of the present invention as well—in the range from 0.1 to 500 µm, preferably in the range from 1 to 200 µm. Suitable refractories are more particularly those materials which have melting points which lie at least 100° C. above the temperature of the particular metal melt used, and/or which do not enter into any reaction with the metal melt.

Refractories, for the production of a refractory coating composition, are usually dispersed in a carrier liquid. The carrier liquid is then a constituent or the constituent of a coating composition that is present in liquid form preferably under standard conditions (20° C. and 1013.25 hPa) and/or which is vaporizable at 150° C. and standard pressure (1013.25 hPa). Preferred carrier liquids, which are also suitable in the context of the present invention, are selected from the group consisting of water and organic carrier liquids and also mixtures thereof with one another and/or with other constituents. Suitable organic carrier liquids are preferably alcohols. Preferred alcohols are ethanol, n-propanol and isopropanol (2-propanol), with ethanol being particularly preferred. In the interests of environmental protection and emissions prevention, however, it is worthwhile when selecting the refractory coating composition to forgo as far as possible the use of organic carrier liquids. In the context of the present invention, the refractories are dispersed in an aqueous phase which hence serves as carrier liquid.

Document DE 600 04 770 T2 discloses a clad casting product having a cast-iron component which comprises a surface clad with aluminum or an aluminum alloy.

Documents US 2002/0157571 A1 and U.S. Pat. No. 6,699,314 B2 each disclose a mold release agent for a centrifugal casting mold, for coating an inner face of an integral centrifugal casting mold, comprising a binder, a thermal insulator, a solvent and a foam component (surface-active substance) having a foaming quality.

Document EP 1 504 833 B1 discloses a cast iron insert around which a different metal is to be cast, comprising: a surface for contact with a molten mass of the other metal which is to be cast around the cast iron insert; and a plurality of projections which are disposed on the surface and each have substantially conical undercuts, which widen starting from the surface increasingly toward the outside.

Document EP 1 902 208 B1 discloses a cylinder sleeve for insert casting which is used in a cylinder block, comprising an outer peripheral surface having a plurality of projections, with each projection having a constricted shape, where a film of a metal material is formed on the outer peripheral surface and on the surfaces of the projections.

Document US 2015/0122118 A1 discloses a cylinder sleeve comprising a multiplicity of projections on its outer face.

Document CN 101554643 A discloses a "Centrifugal casting coating for cylinder liners and preparation method thereof" (English translation of the title according to Espacenet translation).

Document CN 103817285 A discloses a "Coating capable of forming mushroom-shaped burrs during centrifugal casting of engine cylinder sleeve" (English translation of the title according to Espacenet translation).

Document EP 1 711 291 B1 discloses a cylinder sleeve for insert casting, having a multiplicity of projections which each have a narrowing on an outer peripheral face.

Document EP 2 422 902 A2 discloses a cylinder sleeve for insert casting which is furnished with projections having heights of 0.3 to 1.2 mm and undercut portions at a ratio of 20 to 80/cm$^2$ on an outer peripheral face, on which, in turn, a thermally sprayed layer has been applied.

Document WO 2017/184239 A1 discloses a refractory coating composition which comprises a carrier liquid and solid ceramic beads.

Document US 2014/0196863 A1 discloses a casting mold for molten metal which has an active surface for contact with molten metal. This surface is coated with a noncrystalline and nonporous insulating coating which forms a thermal barrier in order to protect the casting mold. The coating comprises a suspension of 10.0 to 55.0 wt % of refractory glass, based on the mass of the suspension, and also a carrier fluid for suspending said amount of refractory glass.

Document EP 2 159 208 A1 discloses a heat insulation element which comprises silica and/or a silicate.

Document EP 2 281 789 A1 discloses a slip formulation for producing a patch or a strip of a thermal protective layer with a ceramic binder, ceramic fillers and optionally further additives.

Document EP 2 618 338 A2 discloses a cable which comprises at least one first conductor pair, with at least one of the first conductor pairs having at least one layer of a composite insulation surrounding the conductor, said composite insulation comprising insulating material and microoxide particles which are capable of raising the flame retardancy of the insulating material and improving the electrical performance of the cable.

Document EP 2 722 863 A1 discloses an embedded terminal component with an insulating housing, which accommodates a vacuum switch and also electrical connections through an injected embedding material, with the injected embedding material being filled with a silicon dioxide filling material.

Document DE 103 39 676 A1 discloses an amorphous, porous, open-pored $SiO_2$ molding and also a method for producing it and use thereof. An $SiO_2$ molding of this kind is produced by pumping a dispersion comprising $SiO_2$ particles into a pressure casting mold of a pressure casting machine, in which the dispersion is dehumidified via an inner and an outer porous polymeric membrane to form the $SiO_2$ molding.

Document DE 10 2006 046 619 A1 discloses a brushable $SiO_2$ slip for producing layered quartz glass, comprising a dispersion liquid and amorphous $SiO_2$ particles having particle sizes up to a maximum of 500 µm, with the greatest volume fraction being made up of $SiO_2$ particles having particle sizes in the range between 1 µm and 60 µm.

Document EP 0 246 181 A1 discloses a microsilica suspension comprising an aqueous-based carrier, at least about 50 wt % of microsilica, based on the weight of the suspension, an anionic dispersant for the microsilica, and a complexing agent which is capable of complexing polyvalent cationic impurities in the microsilica.

Document WO 2017/009216 A1 discloses molds for precision casting that comprise $ZrO_2$-containing metal oxide dusts. The document likewise discloses compositions which comprise $ZrO_2$— and/or —$Al_2O_3$— containing metal oxide dusts or furnace dusts for producing molds for precision casting.

Document WO 2008/118023 A1 discloses a coating composition for a casting mold for the directed solidification of silicon, which comprises silicon nitride particles, a carbon source, and a powder of oxide and/or of silicon.

Document DE 15 08 913 A1 discloses a method for preventing erosion of the surface of the bottom parts of a metal casting mold that come into contact with impinging molten metal, and for preventing the sticking of the cast blocks to the bottom parts, wherein a suspension of a refractory substance suspended in a binder is applied to the surface that is to be protected, in an amount sufficient to form a covering of sufficient thickness for preventing erosion and sticking, after which the wet covering is dried.

Document DE 10 2017 106 458 A1 discloses elements for insertion, where the insertion face of the elements has a mandated shape (a projection). DE 10 2017 106 458 A1 also discloses a method for producing such elements for insertion, using a mold coating composition comprising diatomaceous earth.

As already explained above, a refractory coating composition in the centrifugal casting process is applied typically in a spraying process, with the aid of a spraying lance, to the inner walls of the centrifugal casting mold. In order to reduce the cycle time and/or for reasons of increasing productivity, it is advantageous to apply the desired amount of the coating composition rapidly. This may be accomplished by spray application in advance (i.e., during the introduction of the spraying lance into the centrifugal casting mold) or in retreat (i.e., during the removal of the spraying lance from the centrifugal casting mold). The coating composition is preferably applied both in advance and in retreat. This ensures more uniform application of the coating composition, and reduces the total amount of coating composition required and/or the spraying pressure per operation. The spray application can be repeated as often as desired in order to obtain the desired application of refractory coating.

Spray application in advance and retreat requires rapid drying of the refractory coating composition applied to the inner walls of the centrifugal casting mold, since in the region of the reversal of the spraying direction (typically at one end of the centrifugal casting mold) there is only a short drying time available, unless the spraying operation is to be interrupted at this point, which entails high complexity and cost. Particularly in the area of structural casting, however, it has emerged that sufficiently rapid drying of the applied coating composition cannot be realized while simultaneously obtaining a refractory coating having surface structuring satisfactory for the purposes of structural casting (e.g., for producing structured casting sleeves) using the refractory coating compositions known from the prior art.

At present, therefore, the production of structured surfaces on the inner walls of centrifugal casting molds for structural casting is realizable only by deployment of much time and material. Increasing the drying rate of refractory coating compositions known to date from the prior art might presumably be achieved, for example, by increasing the fraction of solid material contained in the known coating compositions. Increasing the solids fraction, however, would lead at the same time to an increase in the viscosity of the coating composition in question, and consequently, according to the estimation of those skilled in the art, the application of such coating compositions by means of spray application on the inner walls of the centrifugal casting mold would no longer be possible (with acceptable pressure and using a nozzle opening suitable for spray application).

It can therefore be stated that the prior art has not disclosed any satisfactory refractory coating composition for producing a refractory coating on the inner walls of a centrifugal casting mold that can be applied to a centrifugal casting mold by means of a spray application, so that (after a short drying time, resulting from a high solids fraction) the resulting refractory coating on the inner walls of the centrifugal casting mold possesses a negative structure which is suitable for producing a metallic casting having a structured surface.

More particularly it may be noted that it is not possible, moreover, with refractory coating compositions known from the prior art to generate uniformly structured surfaces (i.e., surfaces where the features of the structure formed include a uniform height) over the entire length of the mold's inner walls.

A further problem of refractory coating compositions known from the prior art for structural casting is that they frequently include a high fraction of crystalline quartz dusts which are a cause of silicosis, such as (calcined) diatomaceous earth, for example.

Moreover, refractory coating compositions known from the prior art for structural casting frequently possess a high fraction of hard, crystalline refractories (e.g., zirconium oxide or α-alumina), which on account of their high abrasive properties contribute to the acceleration in mold wear when the casting is being pulled.

Starting from the prior art, therefore, there is a demand for a refractory coating composition for producing a refractory coating on the inner walls of a centrifugal casting mold by means of a spray application, said composition exhibiting or being intended to enable one or more, preferably all, of the following advantageous properties:

the refractory coating composition applied by means of a spray application to the inner walls of a centrifugal casting mold is to enable a high drying rate under industrial conditions, in order thereby to be able to ensure a low cycle time/a high productivity;

the refractory coating produced on the inner walls of a centrifugal casting mold, using the refractory coating composition, is to possess a negative structure which is suitable for producing a metallic casting having a (positively) structured surface, where the negative structure is to be able to be generated over the entire length of the inner walls of the centrifugal casting mold by means of a spray application;

the refractory coating produced using the refractory coating composition is to possess an aligned insulating effect for controlling the microstructure qualities in the centrifugal casting;

the refractory coating composition for producing a refractory coating on the inner walls of a centrifugal casting mold is to contain, for reasons of workplace safety, a fraction of crystalline quartz dusts that is particularly low by comparison with conventional coating compositions for the centrifugal casting process;

the refractory coating composition for producing a refractory coating on the inner walls of a centrifugal casting mold is to possess a fraction of hard, abrasive refractories that is particularly low by comparison with conventional coating compositions for the centrifugal casting process, to the benefit of reduced mold wear;

the refractory coating produced using a refractory coating composition is to possess a particularly low loss on ignition, so that the resultant evolution of gas during the casting operation, and the associated risk of casting defects, are avoided/reduced.

It was a primary object of the present invention to specify a refractory coating composition for producing a refractory coating on the inner walls of a centrifugal casting mold, said composition possessing or enabling one or more, or all, of the properties stated above.

A further object of the present invention was to provide a corresponding method for producing a centrifugal casting mold, provided on its inner walls with a refractory coating, for use in the centrifugal casting process.

A further object of the present invention was to provide a corresponding method for producing a casting in the centrifugal casting process.

It was a further object of the present invention, moreover, to specify a centrifugal casting mold for use in the centrifugal casting process, having a corresponding refractory coating on the inner walls of the centrifugal casting mold.

Further objects are apparent from the description hereinafter and from the claims.

The invention is more closely defined/described in the appended claims and in the present description, including particularly preferred combinations of preferred parameters, properties and constituents of the invention. Specific and/or preferred embodiments of the invention are described with greater precision below. Unless otherwise indicated, preferred aspects or embodiments of the invention can be combined with other aspects or embodiments of the invention, more particularly with other preferred aspects or embodiments. The combination of respectively preferred aspects or embodiments with one another produces in turn preferred aspects or embodiments of the invention. Embodiments, aspects or properties which are described, or described as being preferred, in connection with the present invention for the inventive use of a refractory coating composition for producing a refractory coating on the inner walls of a centrifugal casting mold are each valid correspondingly or analogously for methods of the invention as well, and also for centrifugal casting molds of the invention for use in the centrifugal casting process.

Where, below, inventive uses of a refractory coating composition for producing a refractory coating on the inner walls of a centrifugal casting mold, methods of the invention and also centrifugal casting molds of the invention for use in the centrifugal casting process are described which "comprise" or "include" more closely defined embodiments, constituents or features, the intention is for the disclosure in each case also to embrace the corresponding variant—to be understood in a narrower scope—of the said uses, methods and/or centrifugal casting molds that "consists" of these embodiments, constituents or features each defined more closely.

In accordance with the invention, the primary object and further above-specified aspects of the general object are achieved through the use of a refractory coating composition as is defined in the appended claims.

According to a further, related aspect, some or all of the above-stated objects are achieved by a method for producing a centrifugal casting mold, provided on its inner walls with a refractory coating, for use in the centrifugal casting process, as is defined in the appended claims.

According to a further, related aspect, some or all of the above-stated objects are likewise achieved by a method for producing a casting in the centrifugal casting process, as is defined in the appended claims.

According to a further, corresponding aspect, the invention relates, furthermore, to a centrifugal casting mold for use in the centrifugal casting process, having a refractory coating on the inner walls of the centrifugal casting mold, as defined in the appended claims.

Preferred embodiments in accordance with the invention are apparent from the dependent claims.

The present invention relates first to the use of a refractory coating composition
  having a solids fraction of more than 69 wt %, based on the total mass of the coating composition,
  and
  having a loss on ignition of less than 0.6 wt % (preferably less than 0.5 wt %), based on the total mass of the solids fraction of the coating composition,
  wherein the coating composition is a dispersion of refractories in an aqueous phase, the refractories at least comprising
  (a)—a total amount in the range from 4 to 50 wt % of particulate amorphous oxide, based on the total mass of the coating composition,
    wherein the particulate amorphous oxide comprises a fraction of 85 wt % or more of silicon dioxide, based on the total amount of the particulate amorphous oxide,
    wherein the particulate amorphous oxide possesses a mass-based $D_{SS}$ of less than 5 μm, determined by laser diffraction,
    wherein the particulate amorphous oxide possesses a porosity of less than 50%, based on the total amount of the particulate amorphous oxide, and
    wherein 90 wt % or more of the particles (preferably: primary particles, see below) of the particulate amorphous oxide possess a sphericity of greater than 0.9, determined by evaluating two-dimensional microscope images,
  or
  a total amount in the range from 4 to 50 wt % of microsilica as particulate amorphous oxide, based on the total mass of the coating composition,
  and
  (b) one or more further refractories,
  wherein 98 wt % or more of the total mass of the refractories are capable of passing through a sieve having a mesh size of 0.75 mm,
  for producing a refractory coating on the inner walls of a centrifugal casting mold by means of a spray application.

The solids fraction in refractory coating compositions of the invention is determined for the purposes of the present invention preferably according to the standard test method of DIN EN ISO 3251:2008-06, more particularly according to the method as explained in example 1 of the present invention. Unless otherwise stated, the method employed in our own studies for determining the solids fraction was that according to example 1. The term "solids fraction" corresponds to the term "nonvolatile-matter content" used in DIN EN ISO 3251:2008-06. Test conditions specified for implementing the method described in DIN EN ISO 3251:2008-06 are preferably a test temperature of 150° C., a test time of 30 min, and an initial mass of 2.5 g.

The high solids fraction of more than 69 wt %, based on the total mass of the coating composition, that is present in coating compositions of the invention results in rapid drying of the coating composition after said composition has been applied to the inner walls of a centrifugal casting mold by means of spray application.

The loss on ignition in refractory coating compositions of the invention is determined for the purposes of the present invention preferably according to the standard test method, using an ignition temperature of 900° C. (rather than 550° C. as specified in EN 12879:2000). The dry masses used when determining the loss on ignition are obtained preferably by drying the respective coating composition of the invention according to DIN EN ISO 3251:2008-06, with the test conditions selected being preferably a test temperature of 150° C., a test time of 30 min, and an initial mass of 2.5 g.

EN 12879:2000 defines the loss on ignition as the mass fraction which escapes as a gas when the dry mass of a sludge is ignited under specified conditions. In the field of centrifugal casting, especially when using a nonvented centrifugal casting mold, the presence of a low loss on ignition relative to the total mass of the solids fraction of the coating composition represents an important condition for the avoidance or reduction of casting defects, since the gas produced during the contact of liquid metal with refractory coating is unable in a centrifugal casting mold (in contrast to the case, for instance, in a foundry molding) to escape to the outside. Copious evolution of gas during the casting process, therefore, necessarily increases the risk of the formation of casting defects. The low loss on ignition of less than 0.6 wt %, based on the total mass of the solids fraction of the coating composition, that is defined in the present invention therefore represents one of a number of conditions allowing a coating composition to be used advantageously in the centrifugal casting process.

The use of an aqueous (i.e., water-containing) phase as carrier liquid carries with it particular advantages in the context of the present invention. First, water (as already explained above) is classed as unobjectionable in the context of environmental protection and emissions prevention. Secondly, water (unlike some organic carrier liquids) is distinguished by vaporization or evaporation without residue. More particularly, on vaporization or evaporation, water does not leave behind any organic residue that might be responsible for a deleterious increase in the loss on ignition of the coating composition. The use of an aqueous phase as carrier liquid is therefore one of the ways of ensuring/enabling the attainment of an inventively low loss on ignition of less than 0.6 wt %, based on the total mass of the solids fraction of the coating composition.

The term "particulate amorphous oxide" refers in the context of the present invention to particulate, synthetic, amorphous oxide, for example and preferably silicon dioxide particles, which are producible by spraying of a silicon dioxide melt, and/or microsilica. A particulate oxide is referred to as amorphous in the context of the present invention if it is possible by x-ray diffractometric studies on said oxide to demonstrate an absence of long-range order of the atoms. A particularly preferred particulate amorphous oxide in the context of the present invention is microsilica. Microsilica is also designated using the CAS number 69012-64-2; cf. Bernd Friede, Per Fidjestøl in the publication Nachrichten aus der Chemie, 2011, 59, 956-958. The use of other particulate amorphous oxides is technically acceptable provided the (minimum) properties defined above and in the claims are present; examples of such other particulate amorphous oxides are given later on below.

The use of a total amount in the range from 4 to 50 wt % of particulate amorphous oxide, based on the total mass of the coating composition, contributes to the coating composition for use in the invention retaining its advantageous rheological properties in spite of the high solids fraction of more than 69 wt %, based on the total mass of the coating composition, and so allowing it to be applied by means of a spray application to the inner walls of a centrifugal casting mold, even with the increased solids fraction.

As already explained above, the particulate amorphous oxide used is preferably silicon dioxide in the form of silicon dioxide particles, producible by spraying of a silicon dioxide melt, and/or microsilica. The use of the aforesaid forms of silicon dioxide within a coating composition for use in the invention is preferred, since these forms exert a particularly positive effect on the rheological properties of the coating composition and therefore make a decisive contribution to the sprayability of the coating composition for use in the invention with the simultaneously high solids fraction. Correspondingly, the particulate amorphous oxide present in said total amount in the coating composition for use in the invention comprises a fraction of 85 wt % or more of silicon dioxide, based on the total amount of the particulate amorphous oxide.

The "mass-based $D_{95}$" of the particulate amorphous oxide present in said total amount in the coating composition for use in the invention is a measurement value which comes from the particle size distribution of the particles of the total amount of this particulate amorphous oxide. The particle size distribution is determined in a conventional way by laser diffraction, preferably by the standard test method according to DIN ISO 13320:2009. $D_{95}$ values ascertained in this context for the cumulative frequency distribution of the mass-averaged size distribution function indicate that 95 wt % of the particles have a particle size which is the same as or less than the specified value (e.g., 5 μm). Suitable instruments for determining the particle size distribution are conventional laser diffraction instruments, for example, of the "Mastersizer 3000" type from Malvern, United Kingdom, preferably of the "Coulter LS 230" type from Beckman Coulter, USA, with the measurement being performed preferably by means of "Polarization Intensity Differential Scattering" ("PIDS") technology. With the aforesaid laser diffraction methods, the scattered light signals are each evaluated preferably according to the Mie theory, which also takes into account the refraction and absorption behavior of the particles.

Where the (primary) particles of the particulate amorphous oxide take the form of agglomerates and/or aggregates and/or assemblies otherwise of a plurality of particles, these assemblies are preferably separated in a conventional way, gently mechanically or in a similar way, before the mass-based $D_{SS}$ of the particulate amorphous oxide is determined and before the sphericity of the particles of the particulate amorphous oxide is determined, in order as far as possible to rule out any distortion of the result.

The term "porosity" refers in the context of the present invention to the open porosity. Open pores are understood in this context to be voids in the particulate amorphous oxide that communicate with one another and also with their surrounding environment. Accordingly, in the context of the present invention, the porosity of the particulate amorphous oxide is defined as the percentage fraction of the open pore volume, based on the total volume. The effect of a low porosity is that the particulate amorphous oxide, when used in the coating composition for use in the invention, takes up only small amounts, or none, of liquid from the aqueous phase; one of the consequences of this is the realization of the particularly low loss on ignition of the coating composition for use in the invention. The porosity of a substance is determined typically (as also in the context of the present invention) by means of mercury porosimetry.

The sphericity is defined in the context of the present invention as the equivalent projection area of a circle (EQPC for short) of a particle, divided by the actual projection area of the particle. The determination of the particle's projection area that is necessary for determining the sphericity is made, for particles having a particle size of smaller than 5 μm, preferably by the standard test method according to ISO 13322-1:2014, and, for particles having a particle size of larger than 5 μm, preferably by the standard test method according to ISO 13322-02:2006.

Modern commercial electron microscope or optical microscope systems permit digital image analysis and therefore convenient determination of the particle morphology. Digital image analysis is preferred for studies on the sphericity. The digital image analysis is carried out preferably by means of commercial image analysis software, such as the Image-Pro Plus software from Media Cybernetics, for example. In preparing the samples for digital image analysis, a random orientation of the particles should be ensured. Where appropriate, thin sections can be produced.

For the purposes of the present invention, the particulate amorphous oxide of the constituent (a) is not included with the "further" refractories of constituent (b). Conversely, further refractories of constituent (b) are those refractories which do not meet all of the criteria set up for the refractories of constituent (a).

Further refractories of constituent (b) used in the context of the present invention are preferably customary refractories known from the prior art, as have already been stated above. Particularly preferred further refractories of constituent (b) used are one or more substances selected from the group consisting of aluminum silicates, phyllosilicates, olivine, talc, mica, graphite, coke, feldspar, kaolins, calcined kaolins, metakaolinite, iron oxide and chromite.

Regarding the customary shape and size of the further refractories of constituent (b), reference may likewise be made to the discussion above of customary refractories known from the prior art, which is applicable correspondingly here.

Conventional centrifugal casting molds and also spraying techniques for producing a refractory coating on the inner walls of a refractory casting mold by means of a spray application, as may be employed in the course of the present invention, are known to the skilled person. Preferably the refractory coating composition of the invention is sprayed under pressure through a single-fluid pressure nozzle onto the inner walls of the centrifugal casting mold and/or atomized on the inner walls of the centrifugal casting mold. Depending on nozzle construction, a jet or a fine sheet of liquid is generated at the nozzle exit. Droplet formation begins at a certain distance from the nozzle exit. Typical nozzles are turbulence, flat jet, impact and hollow cone pressure nozzles. The opening of typical nozzles may possess a circular form or an oval form. In the case of a circular opening, the diameter of the nozzle is preferably not more than 4 mm. In the case of an oval nozzle, the smallest dimension of the opening is preferably not more than 3.5 mm.

A refractory coating composition for use in the invention may be present in a relatively highly concentrated form (as a concentrate); a coating composition of this kind (concentrate) is then preferably diluted in certain cases in order to enable or facilitate its spray application using customary apparatus. However, direct application (direct use without dilution) is likewise possible (depending on the choice of the spray application apparatus).

Preference is given to the use in the invention of a refractory coating composition whose solids fraction is in the range from more than 69 wt % up to a maximum of 80 wt %, preferably a maximum of 75 wt %, based on the total mass of the coating composition. Coating compositions having a higher solids fraction than 75 wt %, preferably having a solids fraction of up to a maximum of 80 wt %, based on the total mass of the coating composition, can be used in the invention, but ought generally to be diluted before use so as to adapt the rheological properties to the requirements of the case in hand. Even at a solids fraction of less than 75 wt %, dilution can be advantageous. In certain cases, direct use is preferred, without interim dilution. In that case it is advantageous to prepare a coating composition which already possesses the rheological properties desired in the usage scenario, and the requisite solids content—e.g., a solids content in the range from more than 69 wt % to 73 wt %.

Preference is given to the use in the invention of a refractory coating composition wherein the particulate amorphous oxide of constituent (a) possesses a loss on ignition of less than 0.6 wt %, based on the total amount of the particulate amorphous oxide of constituent (a), preferably a loss on ignition of less than 0.5 wt %, more preferably of less than 0.3 wt %. Regarding the definition, the determination and the need for a low loss on ignition in the context of the present invention, reference may be made to the above discussion of the loss on ignition, which is applicable correspondingly here.

One of the ways, therefore, in which the low loss on ignition is realized, based on the total mass of the solids fraction of the coating composition, is preferably that the particulate amorphous oxide of constituent (a) present in the coating composition of the invention itself possesses a loss on ignition of at least less than 0.6 wt %, based on the total amount of the particulate amorphous oxide, preferably a loss on ignition of less than 0.5 wt %, more preferably of less than 0.3 wt %. The low loss on ignition of the particulate amorphous oxide of constituent (a) is due in particular to the fact that the particulate amorphous oxide of constituent (a) absorbs only small amounts, or none, of the aqueous phase in which it is present as a dispersion in the invention. The absent or only weakly pronounced tendency of the particulate amorphous oxide of constituent (a) to absorb aqueous phase ensures that only small amounts, or none, of aqueous phase remain in any pores of the particulate amorphous oxide, for example, after the removal and/or drying of the coating composition of the invention. Conversely, the good drying properties of the particulate amorphous oxide lead to a low loss on ignition of the particulate amorphous oxide of constituent (a), thereby positively influencing the loss on ignition of the overall mass of the solids fraction.

Preference is given to a refractory coating composition which can be used in the invention and wherein the coating composition comprises (i) zirconium oxide, (ii) carbon and/or (iii) a Lewis acid, preferably as secondary constituents from the preparation of the particulate amorphous oxide of constituent (a).

The term "secondary constituent" in the context of the present invention means that the refractory coating composition includes such secondary constituents only in small amounts, which may originate, for instance, as impurities or adhesions from preceding preparation and/or processing operations on the particulate amorphous oxide. The stated secondary constituents are present in the coating composition preferably in an amount of not more than 15 wt % (or mass fraction), more preferably in an amount of not more than 10 wt %, most preferably in an amount of not more than 5 wt %, based in each case on the total amount of the particulate amorphous oxide of constituent (a).

Zirconium oxide (also identified as zirconia, zirconium dioxide or zirconium(IV) oxide) refers to the oxide of the element zirconium. It may comprise small fractions of other metal oxides.

The refractory coating composition for use in the invention may comprise one or more Lewis acids and/or mixtures thereof. A "Lewis acid" in the context of the present invention is an acid according to the concept proposed by G. N.

Lewis, whereby an acid is an electron pair acceptor, i.e., a molecule or ion with an incomplete noble gas configuration, which is able to accept an electron pair provided by a Lewis base and with this electron pair to form what is called a Lewis adduct. A Lewis acid is electrophilic, while a Lewis base is nucleophilic. Accordingly, molecules and ions which are not acids according to the classical ideas may also be interpreted as being (Lewis) acids.

Those properties of the refractory coating composition for use in the invention that are relevant for the purposes of the present invention are not significantly different when the aforementioned substances/groups (i) to (iii) are present than when they are absent. For producing the coating composition for use in the invention, therefore, there is no need to employ high-purity starting materials; it is instead possible to use standard commercial starting materials (with their typical secondary constituents or impurities; cf. (i), (ii) and (iii)).

Likewise preferred is a refractory coating composition which can be used in the invention and wherein the particulate amorphous oxide of constituent (a) comprises a fraction of 90 wt % of silicon dioxide or more, preferably 95 wt % or more of silicon dioxide, based in each case on the total amount of the particulate amorphous oxide of constituent (a).

Regarding the advantages which result from the fact that the particulate amorphous oxide of constituent (a) comprises such a high fraction of silicon dioxide, based on the total amount of the particulate amorphous oxide of constituent (a), reference may be made to the above discussion of particulate amorphous oxide, which is applicable here correspondingly.

Preference is given, furthermore, to a refractory coating composition which can be used in the invention or preferably in the invention, wherein 90 wt % or more of the particles of the particulate amorphous oxide of constituent (a) possess a sphericity of greater than 0.95, determined by evaluating two-dimensional microscope images
and/or
wherein the particulate amorphous oxide of constituent (a) possesses a mass-based $D_{SS}$ of less than 3 µm, preferably less than 2 µm, more preferably less than 1 µm, determined by laser diffraction.

Regarding the definition and the determination of sphericity and mass-based $D_{SS}$, reference may be made to the above discussion of sphericity and mass-based $D_{SS}$, which is applicable here correspondingly.

In the context of the present invention, preference is given to the use of particularly round particles of the particulate amorphous oxide of constituent (a) (i.e., having a high sphericity) and/or of particularly small particulate amorphous oxide (i.e., with low mass-based $D_{95}$), since both properties exert a positive effect on the rheological behavior (or flow behavior) of the refractory coating composition and therefore contribute decisively to the sprayability of the coating composition for use in the invention, in conjunction with a high solids fraction. The use of microsilica is particularly preferred accordingly.

Likewise preferred is a refractory coating composition which can be used in the invention or preferably in the invention and wherein the particulate amorphous oxide of constituent (a) comprises one or more constituents selected from the group consisting of
silicon dioxide particles which are producible by spraying a silicon dioxide melt, and
microsilica,
preferably a total fraction of 85 wt % or more of one or all of these constituents, preferably 90 wt % or more, more preferably 95 wt % or more, based in each case on the total amount of the particulate amorphous oxide of constituent (a).

One option known per se and preferred in the context of the invention for producing particulate amorphous oxide of constituent (a), therefore, is the spraying of a silicon dioxide melt. The production of particulate amorphous oxide of constituent (a) by means of spraying a silicon dioxide melt has the advantage of providing access to small (silicon dioxide) particles (i.e., particulate amorphous oxide with low mass-based $D_{95}$) which at the same time have a high sphericity. In a production process of this kind, it is preferred (as in other preferred production processes as well) to deliberately forgo the implementation of a grinding operation (downstream of the spraying), since such a grinding operation could have an adverse effect on the high sphericity of the particles of the particulate amorphous oxide of constituent (a) produced.

As already mentioned above, microsilica (CAS number: 69012-64-2) is a further type, known per se and particularly preferred in the context of the invention, of particulate amorphous oxide of constituent (a). Microsilica is formed typically as a byproduct of the industrial production of silicon and ferrosilicon in an electric arc furnace by reduction of silica sand with coke or anthracite, with the formation first of silicon monoxide gas, which is subsequently oxidized further to silicon dioxide. On subsequent cooling, the silicon dioxide formed condenses to form particulate, amorphous microsilica.

Microsilica consists preferably of almost perfect spheres of amorphous silicon dioxide, as verified by electron microscopy studies. In contrast to other particulate amorphous oxides of constituent (a) that are preferred in the context of the present invention, moreover, the particles in the microsilica are typically not sintered together, being instead present in the form of isolated spheres which form completely dispersible agglomerates. As a result of the properties stated above, microsilica is especially capable of positively influencing the rheological properties of refractory coating compositions for use in the invention, thereby ensuring more particularly that the coating compositions, in spite of a high solids fraction of more than 69 wt %, remain sprayable and/or can be applied by means of a spray application to the inner walls of a centrifugal casting mold.

On account of the positive properties associated with the use of microsilica as particulate amorphous oxide of constituent (a), one preferred embodiment of the present invention relates to the use of a refractory coating composition
having a solids fraction of more than 69 wt %, based on the total mass of the coating composition,
and
having a loss on ignition of less than 0.6 wt %, based on the total mass of the solids fraction of the coating composition,
wherein the coating composition is a dispersion of refractories in an aqueous phase, the refractories at least comprising
(a) a total amount in the range from 4 to 50 wt % of microsilica as particulate amorphous oxide, based on the total mass of the coating composition,
and
(b) one or more further refractories,
wherein 98 wt % or more of the total mass of the refractories are capable of passing through a sieve having a mesh size of 0.75 mm, for producing a refractory coating on the inner walls of a centrifugal casting mold by means of a spray application.

For the use of microsilica as particulate amorphous oxide of constituent (a), the statements made above are generally valid correspondingly.

Preference is likewise given to a refractory coating composition which can be used in the invention or preferably in the invention and wherein the particulate amorphous oxide of constituent (a) comprises a fraction of 85 wt % or more of microsilica, preferably a fraction of 90 wt % or more, more preferably a fraction of 95 wt % or more, based in each case on the total amount of the particulate amorphous oxide of constituent (a), wherein preferably
the microsilica is a zirconium-containing microsilica, preferably a zirconium-containing microsilica as obtained as a secondary product in the production of zirconium oxide in an electric arc process,
and/or
a dispersion of the particulate amorphous oxide of constituent (a) in distilled water, with a concentration of the particulate amorphous oxide of constituent (a) of 10 wt %, based on the total mass of dispersion, possesses a pH of less than 7, preferably of less than 6.5,
and/or
the weight-average size of the primary particles of the microsilica is in the range from 100 nm to 150 nm.

Particularly preferred in the context of the present invention is the use of microsilica of the kind obtained as a secondary product in the production of zirconium oxide in an electric arc process. This particularly preferred mode of production for microsilica ensures that a corresponding refractory coating composition preferably comprises zirconium dioxide as a secondary constituent.

Refractory coating compositions for use in the invention for coating molds are usually dispersions of fine-grained, refractory to highly refractory inorganic materials (refractories) in a carrier liquid, e.g., an aqueous (i.e., water-containing) carrier liquid. Such dispersions is preferably preparable by dispersing an amount of the particulate amorphous oxide of constituent (a) in distilled water to form a dispersion having a fraction of 10 wt % of particulate amorphous oxide of constituent (a), based on the total mass of the dispersion.

For the purposes of the present invention, the pH in a refractory coating composition is determined in each case from the dispersion, preferably according to standard test method DIN 19260:2012-10.

The term "primary particles" in the context of the present invention refers to the individual microsilica particles perceptible as individuals by suitable physical methods (e.g., optical microscopy or electron microscopy). Primary particles are therefore to be differentiated clearly from agglomerates (a collection of primary particles joined to one another loosely, by van der Waals forces for example) or aggregates (fused or sintered-together assembly of primary particles connected via chemical bonds). In contrast to other amorphous oxides such as fumed silica and precipitated silica, for example, the primary particles in the microsilica are predominantly present not in the form of aggregates but rather as isolated spheres which form fully dispersible agglomerates.

The weight-average size of the primary particles of the microsilica is determined preferably by the recording and analysis of optical microscope or electron microscope images (cf. also the discussion above regarding the determination of the sphericity of the particulate amorphous oxide particles). Modern commercial electron microscope or optical microscope systems permit digital image analysis and therefore convenient determination of the weight-average size of the primary microsilica particles. Digital image analysis is preferred for studies on the weight-average size of the primary microsilica particles. The digital image analysis is carried out preferably by means of commercial image analysis software, such as the Image-Pro Plus software from Media Cybernetics, for example. In preparing the samples for digital image analysis, a random orientation of the particles should be ensured. Where appropriate, thin sections can be produced.

Where the primary microsilica particles take the form of agglomerates and/or aggregates and/or collections otherwise of a plurality of particles, they are preferably separated in a conventional way (e.g., by ultrasound treatment) gently, mechanically or in a similar way, before the determination of the weight-average size of the primary particles, in order as far as possible to rule out any distortion of the result.

Regarding the advantageous effect associated with the use of a total fraction of 85 wt % or more of one or all of the aforementioned preferred particulate amorphous oxides of constituent (a), preferably 90 wt % or more, more preferably 95 wt % or more, based in each case on the total amount of the particulate amorphous oxide of constituent (a), reference may be made to the above discussion concerning the advantageous effect of a high fraction of silicon dioxide, which is applicable here correspondingly, mutatis mutandis.

A further preferred embodiment is a refractory coating composition which can be used in the invention or preferably in the invention and wherein the particles of the particulate amorphous oxide of constituent (a) possess a pozzolanic activity. This means that such particles are capable of reacting with calcium hydroxide in the presence of water. This pozzolanic activity positively influences the adhesion of the refractory coating on the cast pipe.

A preferred particulate amorphous oxide of constituent (a) having pozzolanic activity that is used is microsilica, which on account of its small particle size and its amorphous nature possesses a high pozzolanic activity.

Further preferred is a refractory coating composition which can be used in the invention or preferably in the invention,
wherein the coating composition comprises a total amount in the range from 4 to 25 wt % of particulate amorphous oxide of constituent (a), based on the total mass of the coating composition, preferably a total amount in the range from 4 to 20 wt %
and/or
wherein the total fraction of particulate amorphous oxides of constituent (a) is less than 50 wt %, based on the total amount of the refractories in the coating composition, preferably less than 25 wt %.

The advantageous properties linked with the present invention are achieved even with the aforesaid (low) total amounts of particulate amorphous oxide in the refractory coating composition for use in the invention (cf. the inventive examples later on below).

Likewise preferred is a refractory coating composition which can be used in the invention or preferably in the invention, comprising
one or more surface-active substances (wetting agents), preferably one or more foam formers, preferably one or more foam formers selected from the group consisting of anionic, cationic and nonionic foam formers, more preferably one or more anionic and/or one or more cationic foam formers, wherein preferably the total fraction of anionic and cationic foam formers is less than 0.5 wt %, based on the total mass of the coating composition, more preferably the total fraction of foam formers selected from the group consisting of anionic, cationic and nonionic foam formers is less than 0.5 wt %, based on the total mass of the coating composition, very preferably the total fraction of foam formers is less than 0.5 wt %, based on the total mass of the coating composition.

Surface-active substances, preferably foam formers, are used advantageously in order to achieve better wetting of the inner walls of the centrifugal casting mold. The skilled person knows of ionic and nonionic surface-active substances. Examples of ionic surface-active substances used are dioctyl sulfosuccinates, and examples of nonionic surface-active substances used are alkynediols or ethoxylated alkynediols, which are also suitable in the context of the present invention.

The use of such surface-active substances in refractory coating compositions for use in the invention is particularly advantageous because these substances reduce the surface tension of the aqueous phase, and may thereby positively influence not only the generation of the surface structure of the refractory coating on the inner walls of the centrifugal casting mold but also the pulling behavior of the cast pipe to be produced.

Preference is likewise given to a refractory coating composition for use in the invention wherein the fraction of crystalline silicon dioxide is less than 3 wt %, based on the total mass of the coating composition, and/or wherein the total fraction of zirconium silicates (also referred to as zirconium silicate or zircon) and zirconium oxide is less than 7 wt %, based on the total mass of the coating composition, and/or wherein the fraction of α-alumina is less than 5 wt %, based on the total mass of the coating composition, and/or wherein the fraction of refractories having a Mohs hardness of more than 7 is less than 5 wt %, based on the total mass of the coating composition, and/or wherein the fraction of diatomaceous earth is less than 10 wt %, based on the total amount of the particulate amorphous oxide of constituent (a).

As already explained above, an excessive fraction of hard refractories within a refractory coating composition accelerates the wear of the centrifugal casting mold used, since a high fraction of hard refractories within the coating composition causes severe abrasion at the inner mold walls during the extraction of the cast pipe from the centrifugal casting mold. Accordingly, it is preferred in the context of the present invention to use coating compositions in which the fraction of hard, abrasive refractories is limited in its amount. Limiting the fraction of hard, abrasive refractories within the coating composition of the invention, consequently, acts to preserve the centrifugal casting mold, thereby at the same time extending the useful life of the centrifugal casting mold.

Diatomaceous earth (also referred to as diatomite or kieselguhr) is a whitish substance in powder form which consists principally of the shells of fossil diatoms (siliceous algae) and constitutes a customary refractory known from the prior art. The fraction of diatomaceous earth in refractory coating compositions for use in the invention is, at less than 10 wt %, based on the total amount of the particulate amorphous oxide of constituent (a), low, since the use of diatomaceous earth is associated with several disadvantages. For example, the use of diatomaceous earth is problematic from the standpoint of health, since the dust of (calcined) diatomaceous earth is one of the crystalline quartz dusts that causes silicosis. Furthermore, the use of diatomaceous earth leads to a disadvantageous increase in the viscosity of the coating composition, since diatomaceous earth has a lower sphericity by comparison with the particulate amorphous oxide of constituent (a) of the invention. Moreover, on account of its porosity of about 85%, diatomaceous earth possesses a high water absorbency, hence adversely affecting the low loss on ignition desired in the invention for the coating composition when diatomaceous earth is used.

Preference is given, furthermore, to a refractory coating composition for use in the invention, comprising an inorganic binder which is preferably selected from the group consisting of phosphates, waterglasses, silica sols and mixtures thereof, wherein the waterglasses are preferably selected from the group consisting of alkali metal waterglasses and/or wherein the phosphates are preferably selected from the group consisting of orthophosphates, polyphosphates and mixtures thereof, more preferably from the group consisting of orthophosphates, metaphosphates and mixtures thereof, very preferably from the group consisting of aluminum phosphates, polyphosphates and mixtures thereof, most preferably from the group consisting of aluminum phosphates, metaphosphates and mixtures thereof, and/or wherein the weight-average molecular weight Mw of the phosphates is preferably greater than 300 g/mol, more preferably greater than 600 g/mol.

The primary purpose of refractory coating binders (binders) is to fix the refractories present in the coating composition on the inner walls of the centrifugal casting mold. Binders may be not only organic but also inorganic. In order to realize as low a loss on ignition as possible for the refractory coating composition, the present invention prefers to use inorganic binders.

Silica sols are aqueous solutions of approximately spherical, colloidally dissolved molecules of polysilicic acid, in which the silicon dioxide content is typically 30 to 60 wt %, based on the total mass of the silica sol. Silica sols may be prepared by treating an aqueous alkali metal silicate solution (waterglass) with ion exchangers and carrying out subsequent stabilization using a substance which gives an alkaline reaction with water.

Alkali metal waterglass refers to glasslike (i.e., amorphous), water-soluble sodium, potassium and lithium silicates which are solidified from a melt, and also to their mixtures and the corresponding aqueous solutions. The term "waterglass" denotes those amorphous, water-soluble sodium, potassium and/or lithium silicates and/or their aqueous solutions and/or mixtures of the aforesaid silicates and/or solutions thereof that have in each case a molar modulus (molar ratio) of $SiO_2$ to $M_2O$ in the range from 1.6 to 4.0, preferably in the range from 1.8 to 2.5, where $M_2O$ denotes the total amount of lithium, sodium and potassium oxides.

Orthophosphates in the context of the present invention are salts and esters of phosphoric acid in which the hydrogen ions of the phosphoric acid have been replaced completely or partly by metal ions or organic radicals. Polyphosphates in the context of the present invention, correspondingly, are salts and esters of polyphosphoric acid which are formed typically from two or more hydrogenphosphates by intermolecular removal of water (condensation) to form P—O—P bridges. Polyphosphates may be straight-chain or branched or cyclic. Cyclically condensed polyphosphates are referred to in general, as in the context of the present invention as well, as metaphosphates or cyc/opolyphosphates. The use of metaphosphates (cyc/opolyphosphates) in refractory coating compositions of the invention is preferred. Aluminum phosphates in the context of the present invention are aluminum-containing phosphate compounds, such as aluminum orthophosphate, aluminum metaphosphate, aluminum dihydrogenphosphate and aluminum polyphosphates, for example.

Likewise preferred is a refractory coating composition for use in the invention that comprises one or more rheological additives, preferably thickeners, more preferably organic thickeners, preferably selected from the group consisting of polysaccharides, proteins and cellulose ethers, or inorganic thickeners, preferably selected from the group consisting of clay minerals such as bentonites, smectites, attapulgites and montmorillonites.

Rheological additives, such as thickeners, for example, are used in order to set the flowability of the refractory coating composition that is desired for processing. Thickeners may be either organic or inorganic in nature, with organic thickeners being preferred in the context of the present invention.

Preferably, the fraction of bentonites or smectites or attapulgites or montmorillonites, more preferably the total fraction of clay minerals such as bentonites, smectites, attapulgites and montmorillonites, very preferably the total fraction of inorganic thickeners, especially preferably the total fraction of rheological additives, is less than 6 wt %, based on the total mass of the solids fraction of the coating composition for use in the invention, preferably less than 3 wt %, more preferably less than 1.5 wt %, and/or is selected such that this fraction possesses a loss on ignition of less than 0.5 wt %, based on the total mass of the solids fraction of the coating composition for use in the invention, preferably a loss on ignition of less than 0.4 wt %, more preferably of less than 0.3 wt %.

Owing to the relatively high loss on ignition of clay minerals such as bentonites, smectites, attapulgites and montmorillonites, this loss being possibly in the region of about 10 wt % (based on the mass of the respective clay mineral itself that is used) in a particular case, depending on physical properties (and adversely affecting the loss on ignition of the total mass of the solids fraction of the coating composition), preference is given to coating compositions having the aforesaid low fraction of corresponding clay minerals.

Additionally preferred is a refractory coating composition of the invention or preferred refractory coating composition of the invention, comprising one or more biocides, preferably one or more bactericides.

The use of biocides is intended in the context of the present invention to prevent infestation of the refractory coating compositions by pests. The use of bactericides serves specifically to prevent infestation of coating compositions with bacteria. Examples of biocides which are also suitable in the context of the present invention are formaldehyde, 2-methyl-4-isothiazolin-3-one (MIT), 5-chloro-2-methyl-4-isothiazolin-3-one (CIT) and 1,2-benzisothiazolin-3-one (BIT). The biocides, preferably the stated individual biocides, are used customarily in a total amount of 10 to 1000 ppm, preferably in an amount of 20 to 500 ppm, based in each case on the total mass of the coating composition.

Further preferred is a refractory coating composition for use in the invention, wherein the coating composition comprises in the aqueous phase an alcohol having a boiling point of less than 100° C. at 1013 hPa, preferably comprising ethanol in the aqueous phase.

The fraction of the alcohol in the aqueous phase is preferably less than 5 wt %, based on the total mass of the refractory coating composition, more preferably less than 3 wt %, very preferably between 2 to 3 wt %. The use of an alcohol having a boiling point of less than 100° C. at 1013 hPa in the aqueous phase acts to increase the drying rate of the coating composition. With regard to the use of alcohols as a carrier liquid, reference may likewise be made to the above discussion concerning carrier liquids, which is applicable here correspondingly.

Likewise preferred is a refractory coating composition which can be used in the invention or preferably in the invention and wherein the one or more further refractories of constituent (b) comprise one or more constituents selected from the group consisting of hollow particles which possess a sphericity of greater than 0.9, determined by evaluating two-dimensional microscope images, preferably hollow particles (i) having crystalline fractions and also preferably (ii) comprising silicon dioxide or silicate, wherein the fraction of these hollow particles is in the range from 0.1 to 10 wt %, preferably in the range from 0.5 to 6 wt %, based on the total mass of the coating composition, ceramic particles which possess a sphericity of greater than 0.9, determined by evaluating two-dimensional microscope images, preferably ceramic particles (i) having crystalline fractions and/or (ii) comprising one or more oxides preferably selected from the group consisting of aluminum oxide, silicon dioxide, zirconium oxide and calcium oxide, more preferably solid particles and/or hollow spheres, very preferably cenospheres.

The hollow particles and/or ceramic particles, preferably ceramic hollow particles, that are present preferably in the constituent (b) in one preferred embodiment of the refractory coating composition for use in the invention are not included, by definition, among the particulate amorphous oxides of constituent (a), as defined above, and so do not possess all of the properties requisite for such inclusion. A crystalline fraction present preferably in the hollow particles and/or ceramic particles (and which implies an at least partial long-range order of the atoms) is detectable by means of x-ray diffractometric studies.

Regarding the definition and determination of the sphericity, reference may be made to the above discussion on sphericity, which is applicable here correspondingly.

Hollow particles possessing a sphericity of greater than 0.9 refer to spherical or almost spherical particles which in the interior have a cavity that occupies 15% or more, preferably 40% or more, more preferably 70% or more of the volume of the particle. This cavity may be completely surrounded by a shell of inorganic material, as in the case of hollow spheres, or may be incompletely surrounded.

Hollow spheres, or ceramic hollow spheres, constitute a preferred embodiment of hollow particles and of ceramic particles in the context of the present invention.

Cenospheres (CAS No.: 93924-19-7) are preferred hollow spheres which are formed during the combustion of coal in power stations, as part of the fly ash, and are deposited from the flue gas stream. The properties of cenospheres are preferably as follows:

external diameter in the range from 10 to 150 µm,
cavity which occupies 70% or more of the total volume of the hollow sphere;
softening point of 1200° C. to 1450° C.,
Mohs hardness of 5 to 6, and
compressive strength of 25 MPa or higher.

Solid ceramic particles which represent another preferred embodiment of ceramic particles differ from hollow ceramic particles and more particularly hollow spheres essentially in that solid particles possess only slight cavities, or none, so giving solid particles a substantially more compact shape by comparison with hollow spheres.

Also preferred is a use according to the invention wherein a refractory coating composition is used having a solids fraction of more than 69 wt %, based on the total mass of the coating composition,
and
having a loss on ignition of less than 0.6 wt %, preferably less than 0.5 wt %, more preferably less than 0.3 wt %, based on the total mass of the solids fraction of the coating composition,
wherein the coating composition is a dispersion of refractories in an aqueous phase, the refractories at least comprising (a)—a total amount in the range from 4 to 50 wt % of particulate amorphous oxide, based on the total mass of the coating composition,
wherein the particulate amorphous oxide comprises a fraction of 85 wt % or more of silicon dioxide, preferably microsilica, based on the total amount of the particulate amorphous oxide,
wherein the particulate amorphous oxide possesses a mass-based $D_{SS}$ of less than 5 µm, preferably less than 3 µm, more preferably less than 2 µm, very preferably less than 1 µm, determined by laser diffraction,
wherein the particulate amorphous oxide possesses a porosity of less than 50%, preferably less than 25%, more preferably less than 10%, based on the total amount of the particulate amorphous oxide, and
wherein 90 wt % or more of the particles of the particulate amorphous oxide possess a sphericity of greater than 0.9, preferably greater than 0.95, determined by evaluating two-dimensional microscope images,
or/and/or
a total amount in the range from 4 to 50 wt % of microsilica as particulate amorphous oxide, based on the total mass of the coating composition,
and
(b) one or more further refractories,
wherein the coating composition comprises:
one or more surface-active substances,
an inorganic binder, and
one or more rheological additives.

Surface-active substances used are preferably the surface-active substances recited above. Inorganic binder used preferably comprises the inorganic binders recited above. Rheological additives used are preferably the rheological additives recited above.

The refractory coating composition for use in the invention is preferably intended and configured for application to a centrifugal casting mold directly, without addition or removal of constituents. Alternatively, the coating composition for use in the invention may take the form of a concentrate, which is optionally diluted before application to a centrifugal casting mold, more particularly by addition of water or an organic carrier liquid. The direct use of the concentrate (without dilution) is likewise possible, however, and is sensible in a particular case. This applies to all embodiments of the present invention, unless otherwise indicated or specified.

A further subject of the present invention is the use of an above-described refractory coating composition of the invention, including its embodiments stated as being preferred, for producing a refractory coating on the inner walls of a (for example, unvented) centrifugal casting mold by means of a spray application, wherein the refractory coating on the inner walls of the centrifugal casting mold possesses a negative structure, for producing a metallic casting having a structured surface, more particularly for producing a metallic casting having a positive structure which is complementary to the negative structure on the inner walls of the centrifugal casting mold.

Preferred is an embodiment of the inventive use wherein the spray application at least in regions of the inner walls is made in two or more coats, the application of the second or at least one of the further coats taking place onto a previously applied, preferably not fully dried coat of the refractory coating.

As already explained above, for applying the desired amount of coating, it is possible to apply two or more coats of the refractory coating composition which can be used in the invention/preferably in the invention to the inner walls of a centrifugal casting mold, where the coating composition, in the application of two or more coats, is applied preferably both in advance and in retreat to the inner walls of the centrifugal casting mold. Performing two-coat or multicoat spray application makes it possible, among other things, to vary the coat thickness of the refractory coating produced on the inner walls of a centrifugal casting mold by means of a spray application, so making it possible, for example, to exert advantageous influence over the insulating effect and also the surface structuring of the refractory coating.

Another subject of the invention is a method for producing a centrifugal casting mold provided on its inner walls with a refractory coating, for use in the centrifugal casting process, having the following steps:

providing or producing a refractory coating composition for use in the invention and/or preferably in the invention, as disclosed above and/or in the claims,
applying one or more coats of the provided or produced coating composition to the inner walls of the (for example, unvented) centrifugal casting mold, preferably with the centrifugal casting mold rotating and/or heated, where preferably the resulting refractory coating at least after drying possesses a negative structure for producing a casting having a structured surface, or for producing a casting having a positive structure complementary to the respective negative structure.

The refractory coating composition provided or produced in the first step of the method of the invention, and the refractory coating composition used in the context of the inventive use, are preferably produced as follows:

providing an amount of aqueous phase,
providing an amount of refractories (a) and refractories (b) (as disclosed above and in the claims in connection with the inventive use and the methods of the invention),
producing a dispersion from the provided refractories (a), the refractories (b) and the aqueous phase, preferably with stirring, where preferably aggregates and/or agglomerates of one or more of the refractories (a) and/or of one or more of the further refractories (b) are disrupted before, during and/or after contact with the aqueous phase, being preferably separated into primary particles,
preferably adding one or more further constituents (e.g., rheological additives, inorganic binder, biocides, surface-active substances, foam regulators, pigments, dyes, etc.) to the amount of aqueous phase and/or to the dispersion produced, more preferably with stirring,
preferably adding an amount of aqueous and/or alcoholic phase to the dispersion produced, more preferably with stirring,
to result in the refractory coating composition.

To produce a refractory coating composition for use in the invention, water, for example, can be introduced in a suitable amount, and the further constituents for producing the coating composition can then be added each in their desired amount to this initial charge, with stirring using a suitable stirrer such as a high-shear stirrer, as for example a toothwheel stirrer or a dissolver stirrer. Where necessary, constituents may be digested in a conventional way before or during the addition. Thus, for example, one or more rheological additives, where appropriate, may be digested using a high-shear stirrer, before or after addition to the initial water charge and individually or together with the refractories. Where the refractories are not digested jointly with any added rheological additives, they may also be digested individually and added to the initial water charge. Then, subsequently, for example, the further constituents of the coating composition can be added to the initial water charge—where appropriate, comprising rheological additives and/or refractories—in any order and preferably with stirring, preferably using a high-shear stirrer, as can, for instance, any inorganic binder, any one or more biocides, any one or more surface-active substances, any one or more foam regulators, any one or more pigments, and/or any one or more dyes.

The refractory coating composition provided or produced in the first step of the method of the invention is preferably intended to be used directly for producing a refractory coating on the inner walls of a centrifugal casting mold by means of a spray application. Alternatively, the coating composition may also first be produced, in a conventional way, as a concentrate, which only later—for example, not until shortly before the inventive use of the coating composition—is diluted—for example, by further addition of water or organic carrier liquids—to a concentration suitable for the intended use and/or the predetermined application technology (this concentration having a viscosity suitable for application by means of spraying), said concentration then being suitable for the respective intended use and/or predetermined application technology, directly for application to the inner walls of a centrifugal casting mold, to produce a refractory coating. Where, in the context of the present invention, quantities or proportions are specified in relation to the coating composition used in the invention, these quantities or proportions are based in each case on a coating composition which is intended for direct application to the inner walls of a centrifugal casting mold by means of a spray application, unless expressly stated otherwise. In general there is no need to mix the individual constituents of the coating composition for inventive use with one another only directly before an as-intended coating procedure on centrifugal casting molds; instead, the mixing may take place very much earlier, since, advantageously, the storage stability of the coating composition for use in the invention is high.

With regard to the applying of one or more coats of the refractory coating composition provided or produced in the first step to the inner walls of the centrifugal casting mold (by means of a spray application), and also with regard to the drying of the applied coating composition, reference may be made to the above observations concerning the application and drying of coating compositions applied by means of a spray application, which are applicable here correspondingly.

Another subject of the invention is a method for producing a casting in the centrifugal casting process, comprising the steps of:
providing or producing a refractory coating composition for use in the invention and/or for use preferably in the invention, as disclosed above and/or in the claims,
applying one or more coats of the provided or produced coating composition to the inner walls of a (for example, unvented) centrifugal casting mold, to produce a refractory coating (up to this point, the method steps implemented correspond to those from the method of the invention for producing a centrifugal casting mold, provided on its inner walls with a refractory coating, for use in the centrifugal casting process),
introducing the casting metal into the rotating centrifugal casting mold whose inner walls have been coated,
solidifying the casting in the rotating centrifugal casting mold,
extracting the casting from the centrifugal casting mold, preferably together with the refractory coating or with parts of the refractory coating, where the refractory coating preferably does not remain adhering to the centrifugal casting mold and/or must be removed mechanically, but is instead extracted with the casting preferably to an extent of 90 wt %, more preferably to an extent of 98 wt %,
where the applying takes place preferably with the centrifugal casting mold rotating and/or heated, and
where preferably the refractory coating at least after drying possesses a negative structure for producing a casting having a structured surface, or for producing a casting having a positive structure complementary to the respective negative structure, and the casting possesses a corresponding structured surface or positive structure.

Depending on the centrifugal casting mold selected in the case in hand, the extraction of the refractory coating in the desired way is influenced or ensured through corresponding selection of the refractory coating composition for use in the invention.

A further subject of the invention is a centrifugal casting mold for use in the centrifugal casting process, having a refractory coating on the inner walls of the centrifugal casting mold,
wherein the refractory coating consists of a dried refractory coating composition, the (undried) coating composition being defined above and/or in the claims,
where preferably the refractory coating consists of those constituents of a coating composition for use in the invention and/or for use preferably in the invention (as disclosed above) that are not vaporizable at 1013 hPa and a temperature of 105° C., preferably 200° C.,
and/or
wherein preferably the refractory coating possesses a negative structure for producing a casting having a structured surface,
and/or
wherein the centrifugal casting mold (having a refractory coating on its inner walls) is producible by the method of the invention for producing a centrifugal casting mold, provided on its inner walls with a refractory coating, for use in the centrifugal casting process, as disclosed above and/or in the claims
and/or
wherein the centrifugal casting mold (having a refractory coating on its inner walls) is producible in accordance with the inventive use and/or a preferably inventive use of a refractory coating composition for producing a refractory coating on the inner walls of a centrifugal casting mold by means of a spray application, as disclosed above and/or in the claims.

EXAMPLES

The examples specified below are intended to explain and describe the invention in more detail without limiting its scope.

Example 1: Production of Refractory Coating Compositions for Use in the Invention and Not in the Invention for Producing a Refractory Coating on the Inner Walls of a Centrifugal Casting Mold by Means of a Spray Application The refractory coating compositions SZ1 to SZ3 for use in the invention, specified in table 1, for producing a refractory coating on the inner walls of a centrifugal casting mold by means of a spray application, and also the refractory coating composition SS1 for use not in the invention, likewise specified in table 1, were produced in a conventional way by mixing the ingredients specified in each case:

For this purpose, the required amount of water was introduced in a suitable pail (batch size in each case around 5 kg of coating composition), the thickeners (polysaccharide, smectite) and the refractories (mullite, microsilica, amorphous quartz glass, cenospheres) were added, and these ingredients were then digested in a conventional way using a high-shear dissolver stirrer for 3 minutes. Next, the inorganic binder (mixture of phosphates and polyphosphates) and also the biocide (2-methyl-4-isothiazolin-3-one, 2.5% strength w/w aqueous solution) were added, in the proportions indicated in table 1, and the mixture was stirred for a further 2 minutes using a high-shear dissolver stirrer. Lastly, the surface-active substance (foam former) was added and was incorporated into and distributed evenly in the dispersion, carefully, using a propeller stirrer. This gave each of the coating compositions specified in table 1, in the form of concentrates.

Optionally, before the inventive use, i.e., before a spray application, for example, the concentrates obtained are diluted to a concentration suitable for the intended use and/or the predetermined application technology, preferably by being mixed with an additional amount of water, an aqueous dispersion medium, alcohol, or an alcohol-containing dispersion medium. Direct application (without dilution) is likewise possible, however, and sensible in a particular case.

TABLE 1

Refractory coating compositions SZ1, SZ2 and SZ3 for use in the invention, and refractory coating composition SS1 not for use in the invention (concentrates) for producing a refractory coating on the inner walls of a centrifugal casting mold by means of a spray application:

| Ingredients: | Refractory coating compositions (concentrates, for use in undiluted or diluted form): | | | |
|---|---|---|---|---|
| | SZ1 [wt %] | SZ2 [wt %] | SZ3 [wt %] | SS1 [wt %] |
| Water | 26.06 | 28.384 | 27.63 | 28.384 |
| Particulate amorphous oxide of constituent (a) (microsilica, containing zirconium) | 10.0 | 9.7 | 10.5 | — |
| First further refractory of constituent (b) (amorphous quartz glass; sphericity < 0.9; DIN 120 grinding; nominal mesh size of analytical sieve = 0.05 mm) | 20.0 | 41.3 | 36.8 | 46.3 |
| Second further refractory of constituent (b) (mullite; crystalline; DIN 125 grinding; nominal mesh size of analytical sieve = 0.045 mm) | 43.0 | 19.7 | 20.4 | 24.4 |
| Third further refractory of constituent (b) (cenospheres, comprising crystalline fractions) | — | — | 3.8 | — |
| Inorganic binder (mixture of orthophosphates and polyphosphates) | 0.4 | 0.39 | 0.45 | 0.39 |
| Organic thickener (polysaccharide) | 0.04 | 0.038 | 0.02 | 0.038 |
| Inorganic thickener (smectite) | 0.3 | 0.29 | 0.2 | 0.29 |
| Biocide (2-methyl-4-isothiazolin-3-one, 2.5% strength w/w aqueous solution) | 0.15 | 0.15 | 0.15 | 0.15 |
| Surface-active substances (foam formers) | 0.050 | 0.048 | 0.05 | 0.048 |
| TOTAL: | 100.0 | 100.0 | 100.0 | 100.0 |

The FIGURES for "DIN grinds" in table 1 mean that the respectively indicated constituent of the coating composition is present in a ground state, where, after the sieving of a sample of this constituent with an analytical sieve having a nominal mesh size in μm (according to DIN ISO 3310-1: 2001-09; cf. the nominal mesh sizes of the analytical sieves as specified in table 1), the residue in each case is in the range from 1 to 10 wt %, based on the amount of sample used.

The coating composition SS1 not for use in the invention comprises no microsilica. SS1 is intended for direct comparison with SZ2; the compositions differ qualitatively only in terms of the presence or absence of the microsilica. The overall mass of the constituents (a) and (b) is constant in SZ2 and SS1, as are the individual masses of the other constituents.

Properties (solids fraction; flow time) of the coating compositions (concentrates) SZ1, SZ2, SZ3 and SS1 as specified in table 1 are reported in table 2.

Prior to the actual use, the coating compositions (concentrates) SZ1, SZ2 and SS1 specified in table 1 were diluted to a viscosity suitable for spray application using a spraying lance by addition of ethanol, or by addition of ethanol and water, and were subsequently homogenized. The amount of ethanol and water used for the dilution in each case, and also properties of the coating compositions obtained after dilution and for use in the invention for producing a refractory coating on the inner walls of a centrifugal casting mold by means of a spray application, are likewise reported in table 2:

the invention. In the table, not all of the properties of a coating composition for use in the invention are repeated, but instead only selected properties are reported.

The solids fractions (contents of nonvolatile fractions) reported in table 2 were measured according to the standard test method DIN EN ISO 3251:2008-06. For the implementation of the method described in DIN EN ISO 3251:2008-06, in the present case, a test temperature of 150° C., a test duration of 30 min and an initial mass of 2.5 g were specified.

The flow times reported in table 2 were determined in analogy to the standard test method DIN 53211 in a cup with a 6 mm outflow nozzle from ERICHSEN GmbH & Co. KG, D-58675 Hemer, model 243/11. Prior to the measurement the coating compositions were stirred for 5 minutes.

The losses on ignition reported in table 2 were measured in accordance with the standard test method EN 12879: 2000, with the ignition temperature used being a temperature of 900° C. (instead of 550° C. as specified in EN 12879:2000). The dry masses, i.e., solids fractions of the coating composition, used when determining the loss on ignition were obtained by drying the respective coating composition according to DIN EN ISO 3251:2008-06, where a test temperature of 150° C., a test time of 30 min and an initial mass of 2.5 g were selected.

In spite of the high solids fraction of in each case >69 wt %, the coating compositions SZ1 (especially diluted, cf. table 2), SZ2 (especially diluted, cf. table 2) and SZ3 are very suitable for producing a refractory coating on the inner walls of a centrifugal casting mold by means of a spray

TABLE 2

Properties of the coating compositions (concentrates) SZ1, SZ2, SZ3 for use in the invention and of the coating composition SS1 not for use in the invention from table 1; indications of the dilution of the concentrated coating compositions SZ1, SZ2 and SS1; properties of the diluted coating compositions SZ1, SZ2 and SS1 for use in the invention and, respectively, not for use in the invention.

|  | SZ1 | SZ2 | SZ3 | SS1 |
|---|---|---|---|---|
| Properties of coating compositions (concentrates as per table 1): | | | | |
| Solids fraction (content of nonvolatile fractions) [wt %] | 73.7 | 71.9 | 72.2 | 71.6 |
| Flow time in the 6 mm cup [s] | 21.7 | 18.5 | 14.7 | not measurable, very viscous |
| Loss on ignition [wt %] | <0.4 | <0.4 | <0.4 | <0.4 |
| Indications of the dilution of the concentrates: | | | | |
| Concentrate (as per table 1), parts by weight | 100.0 | 100.0 | — | 100.0 |
| Ethanol, parts by weight | 5.5 | 2.9 | — | 2.9 |
| Water, parts by weight | — | — | — | 5.0 |
| Properties of the diluted coating compositions: | | | | |
| Solids fraction (content of nonvolatile fractions) [wt %] | 69.9 | 69.9 | — | 66.4 |
| Flow time in the 6 mm cup [s] | 12.1 | 13.5 | — | 11.1 |
| Loss on ignition [wt %] | <0.4 | <0.4 | — | <0.4 |

The coating compositions SZ1, SZ2 and SZ3 specified in table 2 (as concentrate; SZ1 and SZ2 also in diluted form; SZ3 can be used directly even without dilution) correspond to coating compositions for use in the invention as defined above and also in the claims. Conversely, the coating composition SS1 likewise specified in table 2 (both in concentrated form and in diluted form), owing to the absence of microsilica, represents a coating composition not for use in application. As a result of the low loss on ignition reported in table 2 and of the associated, only slightly pronounced formation of decomposition gases during the casting procedure, moreover, the coating compositions SZ1, SZ2 and SZ3 are suitable for the inventive use in (unvented) centrifugal casting molds.

The high-viscosity coating composition SS1 in the form of a concentrate can be applied by means of a spray application only after substantial dilution with ethanol and water (cf. table 2); only after this substantial dilution, indeed, is the viscosity low enough for sprayability to be achieved of the kind present in the case of SZ3 (undiluted) and also in SZ1 and SZ2 (diluted only with ethanol). On account of the substantial dilution, however, the solids fraction of the coating composition SS1 is only 66.4 wt %. This low solids fraction for the (diluted) coating composition SS1 results in a disadvantageously long drying time. Moreover, with the (diluted) coating composition SS1, it is not possible to produce refractory coatings with a (uniform) negative structure of the kind that are required for producing castings having a structured surface.

Example 2: Use of the Coating Compositions SZ2 and SZ3 for Use in the Invention, Described in Example 1, for Producing a Refractory Coating on the Inner Walls of a Centrifugal Casting Mold by Means of a Spray Application and Hence for Producing a Centrifugal Casting Mold of the Invention Using the coating compositions SZ2 (diluted, cf. table 2) and SZ3 (undiluted) described in example 1, a refractory coating was produced in a conventional way by means of a spray application on the inner walls of a centrifugal casting mold for producing cylinder sleeves, this mold possessing an internal diameter of around 80 mm and a total length of around 2 m.

For each 125 mm of mold length, a quantity of around 110 g of the coating composition SZ2 (diluted) was applied using a spraying lance to the inner walls of the rotating centrifugal casting mold, which was at a temperature of about 360° C. This produced a sufficient insulation effect.

When using the coating composition SZ3 (undiluted), which was likewise applied to a rotating centrifugal casting mold with the same dimensions, possessing a temperature of about 360° C., the sufficient amount of coating to obtain a refractory coating with sufficiently high insulating effect was around 10% lower (around 100 g per 125 mm of mold length) by comparison with SZ2.

The spray-in times for applying the coating compositions SZ2 and SZ3 were in each case 25 s for the coating of a mold length of 2 meters. The drying times of the applied coating compositions were in each case sufficiently short, and so the time, measured from the start of the respective application of the respective coating compositions up to the beginning of the respective casting operation, was only 35 s in each case. The refractory coatings resulting after the drying of the respective coating compositions possessed uniform negative structures over the entire length of the centrifugal casting molds, these structures being outstandingly suitable for the production of castings having a structured surface.

Centrifugal casting molds for use in the centrifugal casting process, produced in this way and provided on their inner walls with a refractory coating, are centrifugal casting molds of the invention for use in the centrifugal casting process, having a refractory coating on the inner walls of the centrifugal casting mold, as defined above and also in the claims. The present example is also an example of a method of the invention for producing a centrifugal casting mold, provided on its inner walls with a refractory coating, for use in the centrifugal casting process, as defined above and also in the claims.

Example 3: Production of a Casting in the Centrifugal Casting Process Using a Centrifugal Casting Mold of the Invention, Having a Refractory Coating on the Inner Walls of the Centrifugal Casting Mold Using the centrifugal casting mold of the invention produced as per example 2, with the refractory coating on the inner walls, produced using coating composition SZ2, the centrifugal casting process was used to manufacture a casting, specifically a pipe, having a structured surface, and this casting was used in a further operating step in order to produce cylinder sleeves. For the manufacture of the pipe, the casting metal was introduced in a conventional way into the rotating centrifugal casting mold with its inner walls coated. After the solidification of the casting in the rotating centrifugal casting mold, the resulting pipe was extracted from the centrifugal casting mold, together with the major part of the refractory coating.

The casting was therefore produced in accordance with examples 2 and 3 in its entirety in accordance with the method of the invention for producing a casting in the centrifugal casting process, as defined above and also in the claims.

A study of the casting produced, after the removal of the refractory coating based on the coating composition SZ2, showed that the positive structure produced on the pipe possessed advantageous structures with undercuts and also an advantageous depth, with the structured surface (positive structure) produced on the pipe being complementary to the negative structure of the refractory coating.

The above-described production of a casting having structured surface was repeated 35 times in the course of a test series. The respective fraction of the refractory coating remaining in the centrifugal casting mold during the extractions of the castings was very low, and it was easy to remove, for example, by blowing out the centrifugal casting mold with compressed air or by brushing out. Only a little dust was produced in this procedure, and was easy to remove by suction.

After the blasting of the pipes produced, using a blasting agent known per se and suitable for the blasting of structured surfaces having undercuts, and after the subsequent cutting of the pipes into segments, only extremely small amounts of refractory coating remained on the structured surfaces of the segments within the test series. Measurements showed that particles of refractory coating were still detectable only on about 6 to 8 area % of the surface of the segments. In order to ascertain the measurement values stated above, the structured surfaces of the segments were examined using a reflected light microscope, with comparison between the light areas (those occupied by residues of refractory coating) and the dark (i.e., clean) cast surfaces.

The amounts of refractory coating (on the surfaces of the segments) that remained after blasting could easily be removed completely in a subsequent finishing step, since they did not adhere strongly to the casting.

Not only the hardness but also the microstructure qualities of all of the castings produced in the course of the test series were in accordance with the specifications.

We claim:

1. A method of producing a refractory coating on the inner walls of a centrifugal casting mold by means of a spray application of a refractory coating composition, wherein the refractory coating composition has:

a solids fraction of more than 69 wt %, based on the total mass of the coating composition, and a loss on ignition of less than 0.6 wt %, based on the total mass of the solids fraction of the coating composition, wherein the refractory coating composition is a dispersion of refractories in an aqueous phase, the refractories at least comprising (a) a total amount in the range from 4 to 50 wt % of particulate amorphous oxide, based on the total mass of the coating composition, wherein the particulate amorphous oxide comprises a fraction of 85 wt % or more of silicon dioxide, based on the total amount of the particulate amorphous oxide, wherein the particulate amorphous oxide possesses a mass-based $D_{95}$ of less than 5 μm, determined by laser diffraction, wherein the particulate amorphous oxide possesses a porosity of less than 50%, based on the total amount of the particulate amorphous oxide, and wherein 90 wt % or more of the particles of the particulate amorphous oxide possess a sphericity of greater than 0.9, determined by evaluating two-dimensional microscope images, or a total amount in the range from 4 to 50 wt % of microsilica as particulate amorphous oxide, based on the total mass of the coating composition, and (b) one or more further refractories, wherein 98 wt % or more of the total mass of the refractories are capable of passing through a sieve having a mesh size of 0.75 mm.

2. The method as claimed in claim 1, wherein the particulate amorphous oxide of constituent (a) possesses a loss on ignition of less than 0.6 wt %, based on the total amount of the particulate amorphous oxide of constituent (a).

3. The method as claimed in claim 1, wherein
the coating composition comprises (i) zirconium oxide, (ii) carbon and/or (iii) a Lewis acid, preferably as secondary constituents from the preparation of the particulate amorphous oxide of constituent (a),
and/or
the particulate amorphous oxide of constituent (a) comprises a fraction of 90 wt % of silicon dioxide or more, based in each case on the total amount of the particulate amorphous oxide of constituent (a).

4. The method as claimed in claim 1, wherein
90 wt % or more of the particles of the particulate amorphous oxide of constituent (a) possess a sphericity of greater than 0.95, determined by evaluating two-dimensional microscope images,
and/or
wherein the particulate amorphous oxide of constituent (a) possesses a mass-based $D_{95}$ of less than 3 μm determined by laser diffraction.

5. The method as claimed in claim 1, wherein the particulate amorphous oxide of constituent (a) comprises one or more constituents selected from the group consisting of
silicon dioxide particles which are preparable by spraying a silicon dioxide melt, and
microsilica.

6. The method as claimed in claim 1, wherein the particulate amorphous oxide of constituent (a) comprises a fraction of 85 wt % or more of microsilica, based in each case on the total amount of the particulate amorphous oxide of constituent (a).

7. The method as claimed in claim 1, wherein
the particles of the particulate amorphous oxide of constituent (a) possess a pozzolanic activity.

8. The method as claimed in claim 1,
wherein the refractory coating composition comprises a total amount in the range from 4 to 25 wt % of particulate amorphous oxide of constituent (a), based on the total mass of the coating composition, and/or
wherein the total fraction of particulate amorphous oxides of constituent (a) is less than 50 wt %, based on the total amount of the refractories in the coating composition.

9. The method as claimed in claim 1, wherein the refractory coating composition
comprises one or more surface-active substances.

10. The method as claimed in claim 1,
wherein the fraction of crystalline silicon dioxide is less than 3 wt %, based on the total mass of the coating composition, and/or
wherein the total fraction of zirconium silicates and zirconium oxide is less than 7 wt %, based on the total mass of the coating composition, and/or
wherein the fraction of α-alumina is less than 5 wt %, based on the total mass of the coating composition, and/or
wherein the fraction of refractories having a Mohs hardness of more than 7 is less than 5 wt %, based on the total mass of the coating composition, and/or
wherein the fraction of diatomaceous earth is less than 10 wt %, based on the total amount of the particulate amorphous oxide of constituent (a).

11. The method as claimed in claim 1, wherein the refractory coating composition comprises an inorganic binder.

12. The method as claimed in claim 1, wherein the refractory coating composition
comprises one or more rheological additives, and/or
comprises one or more biocides.

13. The method as claimed in claim 1, wherein the refractory coating composition comprises one or more rheological additives,
wherein a fraction of rheological additives is selected such that this fraction possesses a loss on ignition of less than 0.5 wt %, based on the total mass of the solids fraction of the coating composition.

14. The method as claimed in claim 1, wherein the refractory coating composition comprises in the aqueous phase an alcohol having a boiling point of less than 100° C. at 1013 hPa.

15. The method as claimed in claim 1, wherein the one or more further refractories of constituent (b) comprise one or more constituents selected from the group consisting of
hollow particles which possess a sphericity of greater than 0.9, determined by evaluating two-dimensional microscope images, wherein the fraction of these hollow particles is in the range from 0.1 to 10 wt %, based on the total mass of the coating composition, and
ceramic particles which possess a sphericity of greater than 0.9, determined by evaluating two-dimensional microscope images.

16. The method as claimed in claim 1, wherein a refractory coating composition is used
having a solids fraction of more than 69 wt %, based on the total mass of the coating composition, and
having a loss on ignition of less than 0.6 wt %, based on the total mass of the solids fraction of the coating composition,
wherein the coating composition is a dispersion of refractories in an aqueous phase, the refractories at least comprising (a) a total amount in the range from 4 to 50 wt % of particulate amorphous oxide, based on the total mass of the coating composition,
  wherein the particulate amorphous oxide comprises a fraction of 85 wt % or more of silicon dioxide, based on the total amount of the particulate amorphous oxide,
  wherein the particulate amorphous oxide possesses a mass-based $D_{95}$ of less than 5 µm, determined by laser diffraction,
  wherein the particulate amorphous oxide possesses a porosity of less than 50%, based on the total amount of the particulate amorphous oxide, and
  wherein 90 wt % or more of the particles of the particulate amorphous oxide possess a sphericity of greater than 0.9, determined by evaluating two-dimensional microscope images,
or
a total amount in the range from 4 to 50 wt % of microsilica as particulate amorphous oxide, based on the total mass of the coating composition,
and
(b) one or more further refractories,
wherein the coating composition comprises:
  one or more surface-active substances,
  an inorganic binder, and
  one or more rheological additives.

17. The method as claimed in claim 1, wherein the solids fraction of the refractory coating composition is in the range from more than 69 wt % to a maximum of 80 wt %, based on the total mass of the coating composition.

18. The method as claimed in claim 1, wherein the solids fraction of the refractory coating composition is in the range from more than 69 wt % to a maximum of 75 wt %, based on the total mass of the coating composition.

19. The method as claimed in claim 1, wherein the refractory coating on the inner walls of the centrifugal casting mold possesses a negative structure, for producing a metallic casting having a structured surface.

20. The method as claimed in claim 1, wherein the spray application at least in regions of the inner walls is made in two or more coats, the application of the second or at least one of the further coats taking place onto a previously applied.

21. A method for producing a centrifugal casting mold provided on its inner walls with a refractory coating, for use in the centrifugal casting process, having the following steps:
  providing or producing a refractory coating composition
  applying one or more coats of the provided or produced coating composition to the inner walls of the centrifugal casting mold, preferably with the centrifugal casting mold rotating and/or heated,
  wherein the refractory coating composition is a dispersion of refractories in an aqueous phase, the refractories at least comprising
  (a) a total amount in the range from 4 to 50 wt % of particulate amorphous oxide, based on the total mass of the coating composition,
    wherein the particulate amorphous oxide comprises a fraction of 85 wt % or more of silicon dioxide, based on the total amount of the particulate amorphous oxide,
    wherein the particulate amorphous oxide possesses a mass-based $D_{95}$ of less than 5 µm, determined by laser diffraction,
    wherein the particulate amorphous oxide possesses a porosity of less than 50%, based on the total amount of the particulate amorphous oxide, and
    wherein 90 wt % or more of the particles of the particulate amorphous oxide possess a sphericity of greater than 0.9, determined by evaluating two-dimensional microscope images, or
  a total amount in the range from 4 to 50 wt % of microsilica as particulate amorphous oxide, based on the total mass of the coating composition, and one or more further refractories,
  (b) wherein 98 wt % or more of the total mass of the refractories are capable of passing through a sieve having a mesh size of 0.75 mm.

22. A method for producing a casting in the centrifugal casting process, comprising the steps of:
  providing or producing a refractory coating composition,
  applying one or more coats of the provided or produced coating composition to the inner walls of a centrifugal casting mold, to produce a refractory coating,
  introducing the casting metal into the rotating centrifugal casting mold whose inner walls have been coated,
  solidifying the casting in the rotating centrifugal casting mold,
  extracting the casting from the centrifugal casting mold,
  wherein the refractory coating composition is a dispersion of refractories in an aqueous phase, the refractories at least comprising
  (a) a total amount in the range from 4 to 50 wt % of particulate amorphous oxide, based on the total mass of the coating composition,
    wherein the particulate amorphous oxide comprises a fraction of 85 wt % or more of silicon dioxide, based on the total amount of the particulate amorphous oxide,
    wherein the particulate amorphous oxide possesses a mass-based $D_{95}$ of less than 5 µm, determined by laser diffraction,
    wherein the particulate amorphous oxide possesses a porosity of less than 50%, based on the total amount of the particulate amorphous oxide, and
    wherein 90 wt % or more of the particles of the particulate amorphous oxide possess a sphericity of greater than 0.9, determined by evaluating two-dimensional microscope images, or
  a total amount in the range from 4 to 50 wt % of microsilica as particulate amorphous oxide, based on the total mass of the coating composition, and
  (b) one or more further refractories,
  wherein 98 wt % or more of the total mass of the refractories are capable of passing through a sieve having a mesh size of 0.75 mm.

* * * * *